United States Patent [19]
Dark

[11] Patent Number: 5,447,257
[45] Date of Patent: Sep. 5, 1995

[54] VALVE TRUMPET SPRING AND SEAL

[76] Inventor: Richard C. G. Dark, 8553 Red Hill Country Club Dr., Rancho Cucamonga, Calif. 91730

[21] Appl. No.: 182,740

[22] Filed: Jan. 14, 1994

[51] Int. Cl.⁶ ............................................. G01F 11/30
[52] U.S. Cl. ................................. 222/336; 137/903; 222/402.1; 222/511; 222/518; 251/335.1; 251/320
[58] Field of Search ............ 222/336, 402.1, 511, 222/518; 251/320, 335.1; 137/903

[56] References Cited

U.S. PATENT DOCUMENTS

| | | | |
|---|---|---|---|
| 597,834 | 1/1898 | Shortle. | |
| 957,347 | 5/1910 | Kennedy | 137/903 X |
| 2,181,900 | 12/1939 | Langdon | 137/903 X |
| 2,270,838 | 1/1942 | Langdon | 137/903 X |
| 2,685,978 | 8/1954 | Crockett | 222/511 |
| 3,417,962 | 12/1968 | Fuerst | 251/262 |
| 3,539,151 | 11/1970 | Reid | 251/242 |
| 3,584,834 | 6/1971 | Reid et al. | 251/321 |
| 4,655,374 | 4/1987 | Guerette | 222/518 X |
| 4,660,748 | 4/1987 | Hagan | 222/518 X |
| 4,860,932 | 8/1989 | Nagy | 222/402.1 |

*Primary Examiner*—Andres Kashnikow
*Assistant Examiner*—Joseph A. Kaufman
*Attorney, Agent, or Firm*—Ronald M. Goldman

[57] ABSTRACT

A compression spring is formed of elastic material in a shape resembling a trumpet horn. Novel valve structures incorporate the trumpet horn spring as a component, the latter of which serves therein to make the valve self restoring and also to provide a fluid seal. One valve is principally applied to dispense pressurized fluid and the other is a simple gravity fed beverage tap.

11 Claims, 2 Drawing Sheets

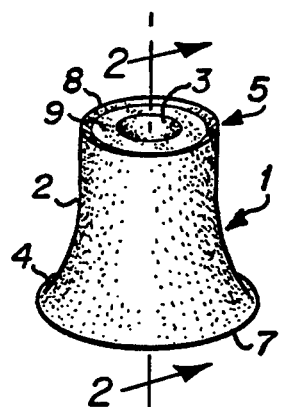
Fig_1
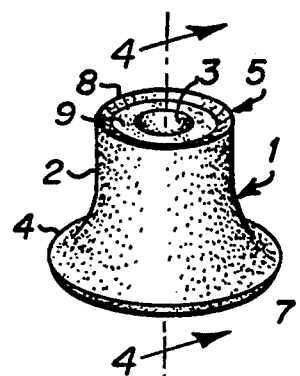
Fig_3
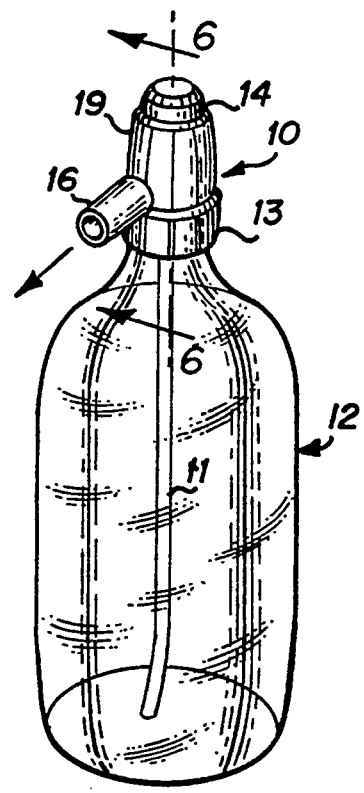
Fig_5
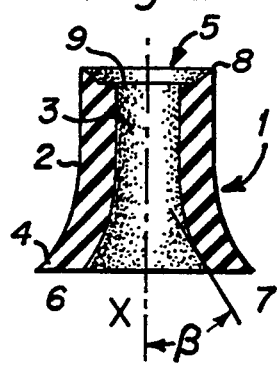
Fig_2
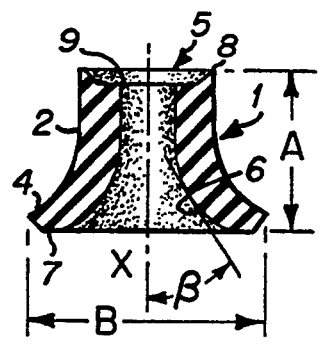
Fig_4
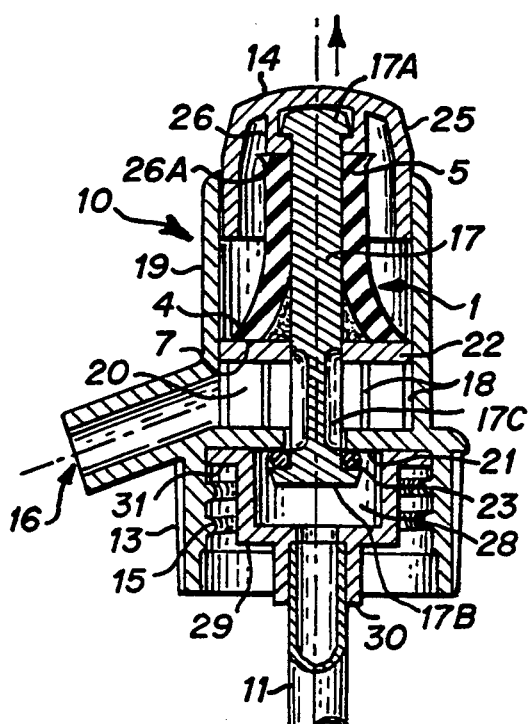
Fig_6
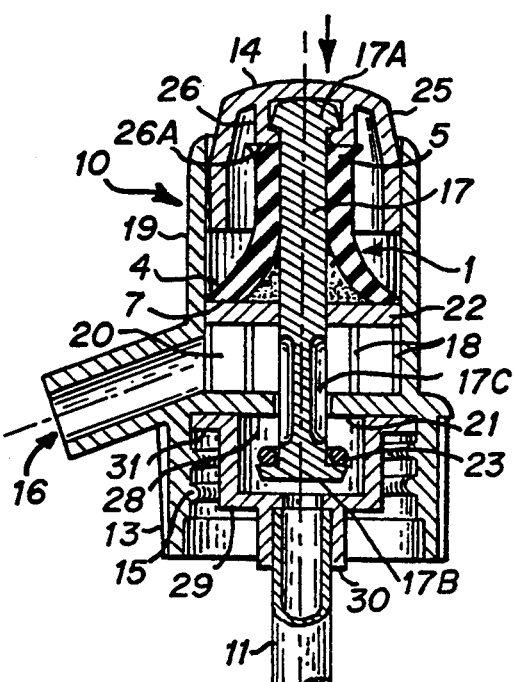
Fig_7

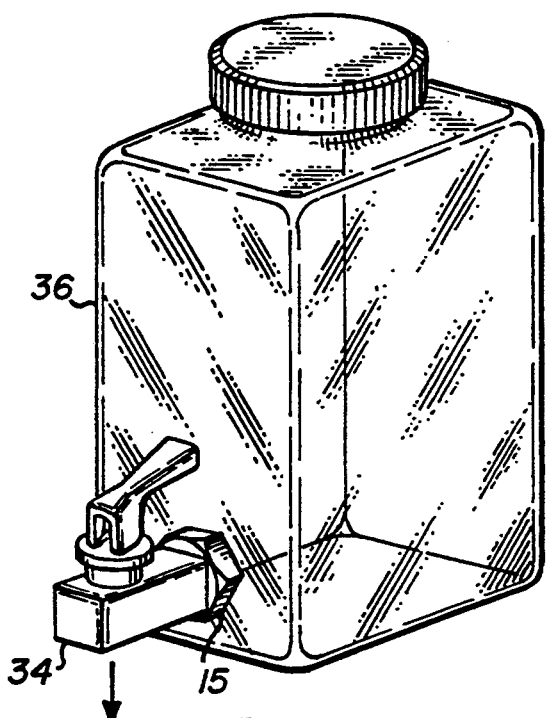
Fig_8
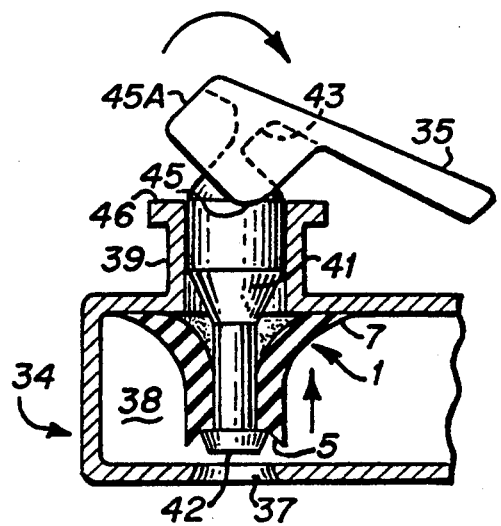
Fig_10
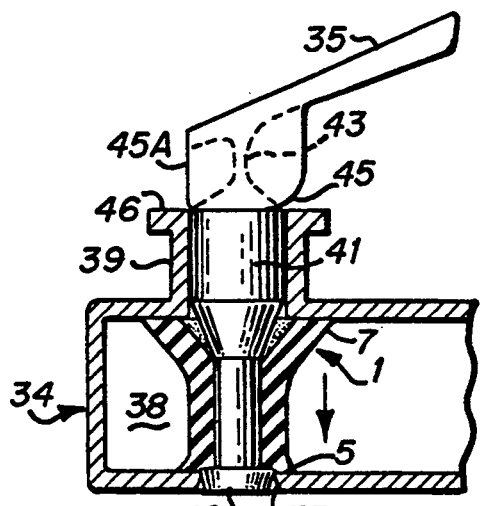
Fig_9
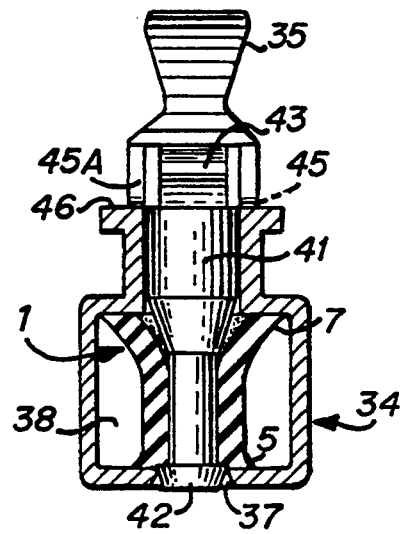
Fig_11

VALVE TRUMPET SPRING AND SEAL

FIELD OF THE INVENTION

This invention relates to a novel compression spring and, more particularly, to a compression spring useful as a combined spring and seal element within fluid dispensing valves, and to the novel multi-piece fluid dispensing valves formed thereby.

BACKGROUND

The valve is a known device used to open and close passages in fluid systems and is widely applied to dispense fluids, such as beverages, from containers. Examples of such kinds of dispensing valves previously patented by the present applicant are found in U.S. Pat. No. 4,848,600, granted Jul. 18, 1989, entitled, Self Closing Dispensing Valve, and U.S. Pat. No. 4,440,327, granted Apr. 3, 1984, entitled Fluid Dispensing Closure with Integral Valve. Prior valve designs include those which incorporate a spring element as a separate discrete component. In such valves the spring is either stretched or compressed as a result of manually opening and holding the valve operated, thereby storing mechanical energy in the elasticity of the spring. That stored energy serves to restore the valve to the sealed or closed position when the holding force is withdrawn. Examples of such valves are given in the prior patents to Reid U.S. Pat. No. 3,539,151, granted Nov. 10, 1970, entitled Valve Construction, Reid et al U.S. Pat. No. 3,584,834, granted Jun. 15, 1971, entitled Manually Operable Elastic Spring and Valve Member, Shortle U.S. Pat. No. 597,834, granted Jan. 25, 1898, entitled Siphon Head and Fuerst U.S. Pat. No. 3,417,962, granted Dec. 24, 1968, entitled Liquid Dispensing Valve and Nagy U.S. Pat. No. 4,860,932, granted Aug. 19, 1989, entitled Bottle Siphon and Dispenser.

As shown by the cited patents to Reid, Reid et al, Shortl, and Fuerst, as example, the spring may be formed of rubber or other elastomeric elastic materials and serve also to provide a fluid seal. Such elastic materials may be readily molded to known shapes and the elastic properties can be adjusted to a degree through selection of the particular material, and the thickness of those shapes, most often through trial and error, to attain the spring characteristic desired in a particular valve design. In those prior patents it appears that a particular elastic non-metallic spring serves as an elastic element in but one valve structure.

The present invention is of a novel spring geometry formed in elastomeric material. As an advantage the spring presented herein is not restricted to application in a single valve design. The novel spring may be incorporated interchangeably, without modification, in at least two novel valve designs, described herein, thereby reducing the number of stock keeping parts required for producing two different valves concurrently.

A principal object of the invention, thus, is to provide a compression spring of elastomeric material in a new geometry.

Molded plastic material is the material of choice in low cost fluid dispensing valves, particularly for bottled or packaged beverages marketed through retail stores to consumers, where manufacturing cost is an important factor. And the fewer the number of components required for the dispensing valve, the fewer steps are required for its assembly.

The new compression spring advantageously serves as an element in a self closing dispensing valve for a confined pressurized fluid, such as carbonated water known as Seltzer, and as a like element in a tap valve and, in fact, a single spring design may be used interchangeably in both valves. Being of an elastic material the spring incorporates seals that are required to avoid valve leakage from the valve actuator and/or from the dispensing tap, thereby eliminating the need for separate seals. Because the spring incorporates fluid seals integrally, fewer elements are required for a practicable valve. The spring seal can be fabricated from an elastomeric material, such as a polyolefin rubber or polystyrene based rubber, that is compatible with the polymer plastic materials selected for the remaining elements in the valve, such as rigid polypropelene, thereby permitting the valve, when discarded, to be recycled easily.

Accordingly another object of the invention is to provide new valve structures that take advantage of the characteristics of the disclosed compression spring by incorporating the new compression spring as a component element;

Still another object of the invention is to provide a valve structure that is environmentally friendly in that it is easily recyclable; and An ancillary object is to provide new and inexpensive valves adapted to beverage applications.

SUMMARY

In accordance with the foregoing objects, a compression spring is formed of elastic material formed in a geometry resembling a trumpet horn. More specifically, the spring contains a tubular portion, which is a generally straight cylinder, and, coaxial therewith, an outwardly flared portion, the latter of which increases in diameter as one progresses along the length of the spring, defining a large circle at the spring's end. In one specific embodiment the spring is relatively uniform in wall thickness, and, in alternative embodiments, the wall thickness may be non-uniform, resulting in a different spring characteristic. Suitably the elastic material for the spring may be molded of rubber, synthetic plastic rubber, neoprene, or other elastomeric non-metal material.

When placed in compression, as by application of an axially directed force at one end of the spring while maintaining the flared end in abutment with a flat or other surface, that prevents axial movement of the flared end, the length of the spring is reduced and the flared end expands or spreads outwardly, with the edge sliding outwardly along the abutment surface. By such elastic deformation the spring stores mechanical energy that is later released when the force is withdrawn. Suitably the flare angle, that is, the angle formed between the springs axis and the side wall is within the range of angles that permit the described action; no less than thirty degrees and up to sixty degrees. Such a spring may be a single trumpet horn. In alternative embodiments the spring may be a dual trumpet horn, one that contains two flared sections arranged back to back with an intermediate tubular section.

In an additional aspect to the invention, a novel valve structure incorporates the foregoing trumpet horn spring. The valve, normally closed, contains the trumpet horn spring, and an actuator that allows the valve to open and pass fluid. When actuated, such as by manually pressing the actuator, the actuator in turn axially compresses the trumpet spring and the spring elastically deforms. The length of the spring is thereby reduced and the flared end thereof expands radially outwardly, thereby storing mechanical energy. Simultaneously, the actuator opens a passage through the valve to a fluid outlet, permitting fluid to exit.

When the actuator is released, the spring elastically restores to its normal shape, releasing the stored mechanical energy, moving the actuator back to its unoperated position, and the valve recloses. In a more specific aspect to the valve, the spring is allowed to remain slightly compressed when the valve is in closed. The spring thereby provides a pre-loading or biasing force that holds the actuator in stable position with the fluid outlet passage closed.

As an added feature, preferably, the elastomeric material selected for the spring is chemically compatible with the plastic material selected for the remaining valve elements to permit the valve to be easily recycled.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 1 is a perspective view of the spring;

FIG. 2 is a section view of the spring in FIG. 1;

FIG. 3 is a perspective view of the spring of FIG. 1 in compressed condition;

FIG. 4 is a section view of the spring in FIG. 3;

FIG. 5 is a perspective view of a bottle containing a novel self closing dispensing valve;

FIG. 6 is a section view of the valve of FIG. 5, showing the valve elements, including the spring of FIG. 1, in the normal condition prior to actuation;

FIG. 7 is the same section view as FIG. 6, but which shows the valve elements in the operated condition when the valve is actuated;

FIG. 8 is a perspective view of another fluid container that incorporates a second dispensing valve;

FIG. 9 is a section view of the valve of FIG. 8, showing the valve elements, including the spring of FIG. 1, in normal unoperated condition prior to actuation;

FIG. 10 is another section view of the valve of FIG. 9 showing the condition of the valve elements when the valve is actuated; and FIG. 11 is a front section view of the valve of FIG. 9, showing the valve elements in normal unoperated condition as in FIG. 9.

DETAILED DESCRIPTION OF THE PREFERRED EMBODIMENTS

Reference is made to FIG. 1 in which the combined compression spring and seal 1 is illustrated in perspective view and to FIG. 2 which shows that same spring in section view. The spring is formed in one piece of elastic material, configured into the three dimensional hollow trumpet shape illustrated, containing a passage 3 that extends between the upper end edge 5 and a bottom end edge 7 and is generally symmetrical about the spring's axis X. The top and bottom ends of the spring define parallel planes orthogonal to the spring axis.

In geometry, the spring resembles that portion of a trumpet horn with a tubular section 2 of uniform diameter and short length that is coupled integrally with a flared portion 4, the latter of which increases in diameter gradually as one proceeds along the spring's axis X to bottom end 7. It is appreciated that the curvature is more than simply the intersection of a cylinder and a right section cone, since there is no abrupt juncture between the protions and like a horn, the flare is gradual, even though the flare angle, $\beta$, is determined by a cone as shown.

Upper end edge 5 contains a very narrow rim or ring shaped lip 8, as variously termed, which functions as a fluid seal, as discussed in detail hereinafter, and, hence may sometimes be referred to herein simply as a seal. From that upper edge the surface tapers radially inwardly and down a short distance to a narrow washer shaped rim 9, recessed from the outer edge of the lip, as better illustrated in FIG. 2. Advantageously in application, recessed rim 9 may serve as a seat to other components in some valve designs. Likewise, bottom end 7 forms a like ring shaped circle or rim, but one that is of greater diameter than the top rim. This end edge also serves as and may be referred to simply as a fluid seal.

The spring's inner wall surface 6 is essentially the same shape as the outer surface. The wall thickness in this embodiment is essentially uniform throughout the length of the spring, but thins slightly in flared portion 4. In other embodiments, the wall may be made non-uniform in thickness.

Spring 1 is a one piece assembly, suitably formed by molding of synthetic rubber. Most synthetic rubbers are thermoplastic materials and can be injection molded, a conventional technique. In less preferred embodiments the spring is formed of natural rubber and is formed to the prescribed shape in a conventional vulcanizing process. As those skilled in the art appreciate, other elastomeric materials may be selected and substituted as desired. Since the elastic properties of different materials may differ, the amount of force required to compress the spring will also differ as a consequence as will the springiness and the particular characteristics are taken into account in applying the spring to a particular valve structure.

With spring 1 seated with its flared end 7 resting upon a smooth flat surface, not illustrated, a predetermined force uniformly applied to upper rim end 5 in the direction of the spring's axis, causes the spring to elastically yield. That is, the spring compresses, reducing the spring's length, as measured along its axis. As it is being compressed the flared bottom end simultaneously spreads or flares outwardly along the flat surface. This condition is illustrated in FIG. 3 in perspective view and in FIG. 4 in section view, wherein the same elements are identified by the same numbers as in the preceding views. In order to allow for spreading action, the surface against which the spreading is to occur should be smooth, since any bumps or protrusions would create frictional forces that would preclude or restrict the necessary flaring action in the operation of the valve.

Each of the spring's top and bottom ends, 5 and 7, form fluid seals. That is, when pressed against a flat surface, those ends prevent fluid from leaking between the inner wall and the outer wall of the spring at the interface with the flat surface. Thus, in addition its usefulness as a spring, the spring serves an additional function, that is of particular advantage when employed as an element of a dispensing valve, such as the dispensing valves described hereafter in this specification.

With a typical force applied, bottom end 7 slightly curls over, yet the remainder of the end surface maintains sufficient seal contact with the flat surface to prevent fluid from leaking at the interface.

The preferred angle for the flare, or flare angle, $\beta$, the angle formed between the inner side walls 6 in the flared portion, the taper, and spring axis X is 30 degrees, as measured with the spring in a totally uncompressed condition, static. It is found that when the flare angle is less than thirty degrees the ability of the flared end to easily spread outwardly when a compressing force is applied to the spring is restricted and erratic, which is not desirable for application in a valve. As the flare angle is increased, the outward spreading of the spring's flared end occurs more easily, when the spring is compressed with the same force as before, reducing the amount of force required to compress the spring.

By varying the flare angle and the durometer hardness of the selected elastomeric or rubber material, the springiness of the spring may be suitably varied. Thus in practical embodiments of the invention, the flare angle is thirty degrees or larger. Even so, no benefit is apparent increasing the flare angle beyond forty five degrees, except when necessary to fit the spring into a confined area that does not allow the smaller angle.

Given a spring length of A+B, where B represents the length of the tubular section 2, as measured along the length of axis X, and A represents the length of the flared section 4, measured along the same axis, the preferred movement of a compressive force in the axial direction, or "stroke" and, hence, the reduction in length of the spring in compression, is approximately equal to 75% of the spring's length. Designing specific applications to that stroke ensures that the spring functions properly. However, it is appreciated that the spring may be compressed in other applications in specific devices to a greater extent, even up to the full length A of the flared section, wherein the flared section ideally should flatten out. However when compressed to such a degree, undesired effects could result. The flared section could curl over and be unable to elastically restore to shape, an unwanted effect.

The length of the tubular section can be of any reasonable length, governed by other factors. As example if it is desired to have the inner wall surface of the spring also serve as a seal to a shaft, such as found in the valves later described, the length, B, should be sufficient to permit sealing to the shaft wall in the valve as determined on a trial and error basis.

It is recognized that in a generic sense the spring may comprise simply the equivalent to the intersection of a small open hollow cylinder and a right section of a hollow cone, the latter of which defines an outwardly directed taper. Such a geometry results in a sharp transition or corner between the cylindrical walls of one portion and the taper in the cone section. As a consequence, although possessing elasticity, springiness, when pressed along the axis it serves as a spring. However the body would always wrinkle in the corner, an obviously undesireable and less preferred effect. The preferred geometry thus allows for a smooth transition between the sections and gradually increasing flare as illustrated and described.

The foregoing spring structure thus provides a new geometry with spring characteristics that may be readily engineered to meet the needs of specific applications.

In one practical embodiment of the invention the spring was of a height of 0.340 inch (0.8636 cm.), the tubular section was of an inner diameter of 0.250 inches (0.635 cm.) and an outer diameter of 0.450 inches (1.143 cm.) and a length of approximately 0.360 inches (0.9144 cm.); the flared end was of a maximum inner diameter of 0.500 inches (1.27 cm.), an outer diameter of 0.700 inches (1.778 cm.) and a length of approximately 0.320 inches (0.8128 cm.), while the flare angle, $\beta$, was approximately 30 degrees.

Reference is made to FIG. 5, which shows in perspective a dispensing valve 10 in application atop the neck of a soda bottle 12, in which soda or seltzer, not illustrated, is confined under pressure, the valve being referred to as a soda valve. The valve contains a straw or plastic tube 11 that extends from the valve to the bottom end of the bottle so that the tube's end is immersed in any confined fluid, not illustrated. The valve contains a push button 14, that the user depresses, which allows fluid to be dispensed from the valve's spout 16 under pressure generated by the bottle's confined fluid.

As illustrated in section in FIG. 6, valve 10 includes a valve housing formed of molded plastic material that includes a cylindrical depending wall 13 containing a screw thread 15 on the inner surface to permit the valve to be screwed to the threaded neck of the bottle, spout 16, a series of short height vertical struts 18 that protrude inwardly from the side wall and distributed about the housing to form a support for another member, a generally washer shaped bottom wall 21 containing a central circular opening, and an upward projecting tubular side wall 19. A washer shaped member 22, containing a central circular opening, inserted through the open upper end of the tubular wall 19, rests atop the splines or struts 18 and serves as an upper wall to a chamber 20 formed thereby with the cylindrical side walls and bottom wall 21.

An actuator rod or shaft 17, of generally cylindrical shape, contains a tapered barb or end cap 17A at the upper end, which is of larger diameter than the principal length of the shaft, and a disk shaped bottom end 17B, that also is of greater diameter than the shaft, to provide a rim surface on which to seat O-ring seal 23, suitably of rubber or neoprene, which encircles shaft 17.

The shaft includes a plurality of axially extending slots 17C. The slots are located at a position along the shaft and are of a length such that with the valve in unoperated position, as is illustrated in this figure, the slots are positioned essentially through chamber 20 and into the interchamber passage to lower chamber 28.

To assemble the valve, the O-ring seal is assembled to the shaft, then the shaft's tapered end cap 17A is inserted from the bottom of the valve housing, tapered end forward, through the interchamber passage in the bottom wall 21 and then through the washer shaped top wall 22, the adjoining housing surfaces elastically yielding to the tapered surface, allowing the shaft's tapered end cap to be forced through the passages in that direction, but not permitting easy withdrawal through those passages. With the bottom end of shaft 17 and the O-ring seal pressed against housing wall 21, compression spring 1 is inserted onto the shaft. The spring elastically stretches as it accommodates the passage of end cap 17A therethrough. This positions the compression spring within the open volume defined by upper tubular housing wall 19. Passage 3 in the tubular portion of the spring frictionally engages the outer surface of cylindrical shaft 17 to provide a fluid seal there between.

As illustrated, push button 14 contains a top end surface, a downwardly projecting tubular skirt 25, circumscribing its top end surface, suitably of a diameter slightly less than that of the inside surface to the housing's tubular wall 19 and another smaller diameter downwardly depending tubular skirt 26, depending from the underside surface and is coaxial with skirt 25. Tubular skirt 26 contains a radially inwardly extending lip or flange 26A.

At this stage of assembly the push button is pressed onto the end cap 17A of shaft 17. The tapered end cap temporarily spreads the rim 26A of the skirt outwardly so that the end cap may pass into position on the shaft with the outer surface of rim 26A in abutment with the top end of compression spring 1, whereupon rim 26A elastically restores to its original shape thereby latching the spring in position on the shaft and in a slightly compressed condition.

With the valve unoperated as shown in FIG. 6, spring 1 produces a bias force on shaft 17, ensuring that the valve remains closed. The spring's length in the static condition, prior to assembly within the valve, is slightly greater than the distance between the bottom of skirt 26A and the upper surface of wall 22, with the bottom end cap 17B and O-ring seal 23 pressed against wall 21 in the illustrated valve structure. That relationship desirably permits the spring to be slightly compressed when locked in position in valve 10, thereby producing an axially directed biasing force that holds shaft 17 in the position illustrated in FIG. 6 with some pressure applied to the O-ring seal to maintain a fluid seal. Any pressure exerted by the bottles contents presses against shaft end 17B, and, hence, strengthens the seal.

The take up tube or straw 11 is connected to the valve housing by a short cylindrical member 29, resembling an inverted cup. A small central protruding tube 30 located on a wall of member 29 provides a friction fit that holds the straw to the housing. The cup includes a ring shaped flange 31 and the outer periphery of that flange fictionally fits within and abuts the lower tubular walls 21 of the valve housing. Being formed of plastic and possessing some elastic resilience, tubular wall 13 expands to permit the cup to be press fit into position, defining a chamber 28 in which the shaft cap end 17B and O-ring seal 23 are positioned.

With the valve screwed in place atop a bottle, as in FIG. 5, filled with soda, the bottle is shaken, causing the soda to emit gas. That gas creates pressure which is required to dispense the bottle's contents. To dispense fluid, push button 14 is manually depressed to move shaft 17 vertically downward and further compress spring 1. In this condition the valve elements attain the condition illustrated in the cross section view of FIG. 7 to which reference is made. The push button pushes shaft 14 down in the direction of the shaft's axis, moving the O-ring 23, carried by the lower shaft end cap 17B, away from surface of bottom chamber wall 23, thereby disengaging the fluid seal and exposing the gap between the sides of shaft 17 and the walls of the interchamber passage between chambers 28 and 20 and lowering the slots 17C into the underlying chamber, which effectively widens the gap or space in the interchamber passage. As this occurs the length of spring 1 is compressed and shortened; the bottom edge 4 of the spring spreads outwardly radially along the smooth upper surface of upper chamber wall 22 until edge 4 abuts tubular walls 9 of the valve housing.

Pressurized fluid in tube 11 and lower chamber 28 rises up, enters and flows through the interchamber passage, including along the slots in shaft 17, enters chamber 20 and passes therethrough, and through spout 16 to exit the valve. In the fully open condition illustrated, spring 1 is compressed and its flared portion 4 has flared further outwardly, widening to a larger diameter than before.

When the push button is released, the extra mechanical energy stored in the spring is also released. By such elasticity the spring presses against the bottom of push button skirt 26A, forcing the pushbutton upward and thereby forces shaft 17, captured by that skirt, to move upward concurrently. The shaft moves until the O-ring 23 reseals against bottom wall 21 to chamber 28, closing the fluid inlet, and limiting further upward movement of the shaft. The valve is thus restored to its normally closed condition as illustrated in FIG. 6 in which spring 1 supplies a biasing force against the push button, and, indirectly, shaft 17.

The valve housing, shaft, pushbutton, wall 22 and member 29 are all formed of plastic material and the complete valve requires only eight components, including the take up straw, to provide a relatively inexpensive easily operated self closing dispensing valve suitable for pressurized fluids.

The same spring may be used in another self closing valve. Reference is made to FIG. 8 which illustrates a spigot tap valve in perspective. The spigot tap 34 is connected to the lower section of a container 36 from which confined fluids are to be dispensed under gravitational force. A manual actuator or handle 35 controls the valve; when the handle is manually pivoted upright, the spigot tap opens and allows confined fluid to flow through an outlet. The novel aspects to the valve structure is better illustrated in the partial section views of FIG. 9, which shows those elements with the valve in normal unoperated condition, FIG. 10, which shows those same elements with the tap open, allowing fluid to be dispensed from the tap, and the partial front section view of FIG. 11.

Valve housing 34 is formed of molded plastic, is generally rectanguloid in shape as illustrated in FIG. 8, and includes housing walls that define a chamber 38 and an opening on the bottom side that serves as a fluid outlet 37. The chamber is connected via any conventional attaching device, not illustrated, located to the right, to a container, as in FIG. 8, to support the valve and to allow fluid stored in the container access to the chamber. The housing includes an upwardly extending tubular wall 39 defining a cylindrical passage that is aligned coaxially with outlet 37.

Compression spring 1 being elastic in character, is squeezed through that smaller cylindrical passage into the inverted position illustrated within chamber 38. The spring is oriented with its flared section seal edge 7 facing up, engaging the top wall of chamber 38, and with its tubular end 5 facing down, essentially surrounding outlet passage 37, whereby the passage through the spring is oriented coaxial with the outlet and with the passage defined by tubular walls 39.

A shaft or actuator 41 is formed of plastic into the complex shape illustrated. Essentially the upper section of the shaft 41 is tubular and is of a diameter that closely approximates the inner periphery of the tubular housing walls 39 so that such shaft portion fictionally engages and to which it seals, a downwardly directed conical section having a conical angle of taper that generally conforms to the taper of flared section 4 of spring 1 and another lowermost tubular section, which is of a smaller diameter than the first tubular section, that is of a diameter that approximately equals the inner diameter of tubular spring section 2 and fits through that spring section. Shaft 41 also carries an outwardly tapered laterally protruding barb or plug 42 at the lower end that abuts and seats in the end edge 5 of the spring.

To assemble the valve, shaft 41 is pressed through the tubular passage in the valve housing, and through the passage in spring 1, which temporarily expands allowing the tapered plug 42 to burrow through, and the plug finally attains its assembled position at least partially obstructing outlet opening 37 in the bottom housing wall and seats in the end edge 5 of the spring to attain the normal position of the elements with the valve in the unoperated, closed, position. Since the flat side of plug 42 is contacting the spring end, not the tapered side, the shaft cannot easily be withdrawn from the spring as becomes more apparent from the description of operation that follows.

At its upper end, actuator shaft 41 is integrally attached to handle 35 by a living hinge 43. In turn, handle is attached to two downwardly depending cam surfaces or cams 45. As shown in the partial front view of FIG. 11, two cams are disposed on each side of handle 35. A surface of each cam abuts the top surface or edge 46 of tubular wall 39, which thus serves as a camming surface.

The end 5 of the spring is of an outer diameter that is greater than the diameter of circular outlet 37. The springs wall thickness is sufficient in dimension to permit its outer seal ring portion to abut the bottom housing wall and provide a fluid seal at that wall and the remaining portion of the spring's thickness at that edge to slightly overlap the outlet passage and thereby seat the flat rim of plug 42. By design the length of the spring is slightly greater than the top to bottom distance or diameter of housing 34. When assembled into the housing and as shown in FIG. 9, the spring is slightly compressed. The spring, hence, provides a biasing force that presses against the housing walls maintaining a fluid seal about the outlet passage so that leakage does not occur from the chamber and also holding the plug and the shaft down.

By pivoting handle 35 clockwise or down, cams 45 are rocked on surface 46, giving leverage to the handle to pull on living hinge 43 and, therethrough, pull shaft 41 upwardly, vertically raising the shaft against the force of spring 1. End plug 42, carried by the shaft, is withdrawn from outlet 37 and presses against the spring's top end 5, further compressing spring 1 to reduce its length and force the spring's flared end 7 to spread outwardly against the upper wall surface, and move the seal on spring edge 5 away from the bottom wall surface, breaking the seal, whereby fluid may pass from the chamber through the outlet 37.

When the handle is moved clockwise in the figure, cams 45 do not lock. Thus when handle 35 is released, spring 1 decompresses, pulling shaft 1 vertically downward in the axial direction and back into the passage. Plug 42 returns to its normal position in the outlet and spring end 5 again seals to the housing wall, thereby plugging and sealing outlet 37. With the shaft 41, through living hinge 43 pulling handle 35, the handle pivots in the counterclockwise direction. The tap is thereby restored to the closed condition as depicted in FIG. 9.

Advantageously, the valve of FIG. 9 has a non-self restoring or toggle mode of operation as an additional feature, a dual mode valve so to speak. The handle is bi-directional and may be pivoted either clockwise, as in the preceeding operation, or counterclockwise. Handle 35, thus, may also be pivoted or rocked counterclockwise and if manually rocked ninety degrees or more, the handle moves to an upright position in which flat cam surface 45A is oriented horizontal and lies flat against the top end 46, lifting shaft 41 over center to open the valve as in the clockwise, and the handle locks in this position, the valve remaining open. The valve is closed by manually forcing the handle in the clockwise direction over a front rounded cam surface, and then moving the handle to the closed position illustrated in FIG. 9 and/or thereafter allowing the spring action to take over to complete closing.

The described dual mode tap valve, apart from the means connecting the valve to the container, is formed of only three components of inexpensive material, in a simple easily assembled structure. This novel valve structure is believed to be ideal for beverage applications that require inexpensive taps, in which the container is disposed of, together with the tap, after the beverage is consumed. A given trumpet spring thus may be used in valves of two different designs.

Preferably, the components of each of the valves, excepting the spring, are suitably fabricated by injection molding of plastic material. The spring may be formed of any of the materials earlier described by any conventional process, including vulcanization. As an added advantage and preference, the spring and the housing and related valve elements are formed of plastic materials that chemically compatible, so that the valve, when disposed of, may easily be recycled.

As example, a prefered embodiment of the spring seal material is a polystyrene based rubber, sold under the brand name "Kraton". That material can be used as an impact modifier in polypropylene. Preferably, the housing and button elements are molded of a rigid polypropylene and the spring and O-ring seal elements molded of Kraton brand rubber. When the assembled valve is recycled, the valve can be ground up into granules without dissassembling the valve. The resulting material is a modified polypropylene, which can be reused. There are also polyolefin rubbers that can be used in place of Kraton, which are also compatible with polypropylene. Such easy reclamation is not possible with other valves, such as those which use a plastic housing and a metal spring. In those the metal spring must be separated from the plastic parts before one can effectively reclaim the materials, a far too costly and time consuming step, which would appear to effectively preclude recycling. Thus the valves described in this specification may be easily recycled and are regarded as friendly to the environment.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A dispensing valve, comprising: a valve housing, with said housing having a first chamber accessible to a fluid container, an outlet through which fluid is to be dispensed and a passage between said first chamber and said outlet:

a spring; actuator means; and stopper means; said spring, actuator means and stopper means being disposed in said valve housing with said stopper means being coupled to said actuator means;

said actuator means being movably mounted in said housing and having an unoperated position in which said passage is closed and an operated position in which said passage is open;

said spring being of predetermined length and comprising a hollow body of elastic material having a trumpet horn shape, having an outwardly flared end portion and an axially extending passage therethrough with said spring biasing said actuator means to the unoperated position;

said actuator means for applying a force on said spring in the direction of said spring axis upon movement of said actuator means to the operated position, wherein the length of said spring reduces and said flared end of said spring expands radially outwardly to temporarily store additional mechanical energy;

said actuator means comprising: a shaft, said shaft having an axis and extending through said passage in said spring, and said shaft being mounted for movement in a direction along the axis of said shaft from an unoperated position to an operated position, responsive to movement of said actuator means from the unoperated position to the operated position;

said stopper means, normally closing said passage between said chamber and said outlet, and, responsive to movement of said actuator means to the operated position, for opening said passage between said chamber and said outlet to permit fluid to pass through said passage and exit said valve housing;

said housing passage including a second chamber, an interchamber passage extending between said second chamber and said first chamber and wherein said outlet is in fluid communication with said second chamber; and wherein said actuator means shaft extends through said second chamber, said interchamber passage, and into said first chamber with said shaft being disposed at least partially obstructing said interchamber passage;

said shaft including: an elongate groove in an outer wall of said shaft, said groove being located at a predetermined position along the length of said shaft and extending a predetermined axial distance, said groove being normally accessible to only one of said chambers when said shaft is in the unoperated position and being accessible to both said first chamber and said second chamber when said shaft is moved to the operated position, whereby said groove provides a fluid passage between said first and second chambers.

2. The invention as defined in claim 1 wherein said stopper means is carried at an end of said actuator means shaft and said stopper means includes an O-ring seal and a disk portion underlying said O-ring seal for providing a sealing engagement between said shaft and said valve housing, responsive to said shaft being in the unoperated position, to seal said interchamber passage and prevent fluid from passing therethrough.

3. The invention as defined in claim 1, wherein each of said actuator means shaft and said disk portion of said stopper means comprise a rigid polystyrene material and wherein said spring comprises a polystyrene based rubber material.

4. The invention as defined in claim 1, wherein said outwardly flared portion of said spring defines a flare angle of 30 degrees relative to said passage axis.

5. The invention as defined in claim 1, wherein said outwardly flared protion of said spring defines a flare angle within the range of thirty degrees to sixty degrees relative to said passage axis.

6. The invention as defined in claim 5, wherein said elastically resilient material comprises an elastomeric material selected from the group consisting of: rubber, neoprene, polystyrene based rubber and polyolefin rubber.

7. A dispensing valve, comprising: a valve housing, with said housing having a chamber accessible to a fluid container and a chamber wall containing an outlet through which fluid is to be dispensed from said chamber:

a spring; and actuator means; said spring and actuator means being disposed in said valve housing;

said actuator means being movably mounted and having an unoperated position in which said outlet is closed and an operated position in which said outlet is open;

said spring being of predetermined length having an axially extending passage therethrough and comprising a hollow body of elastic material having a trumpet horn shape defining an outwardly flared end portion;

said actuator means for applying a force on said spring in the direction of said spring axis upon movement of said actuator means to the operated position, wherein the length of said spring reduces and said flared end of said spring expands radially outwardly to temporarily store additional mechanical energy;

said actuator means comprising: a shaft, said shaft having an axis and extending through said passage in said spring, and said shaft being mounted for movement in a direction along the axis of said shaft from a normal position to an operated position, responsive to movement of said actuator means from the unoperated position to the operated position;

a plug located at one end of and carried by said shaft;

said plug including a first surface normally in blocking relationship with said outlet for at least partially obstructing said outlet and being movable away from said outlet, responsive to said shaft being moved to the operated position; and said plug including a second surface, opposed to said first surface, said second surface engaging one end of said spring for holding said spring on said shaft and, responsive to said shaft being moved to the operated position, for applying an axial force on said spring; and wherein said spring includes a fluid sealing surface at said one end circumscribing said plug, said fluid sealing sealing surface being normally in engagement with a portion of said chamber wall about said outlet to define a stopper; said stopper, normally closing said outlet to prevent fluid from exiting said chamber, and, responsive to movement of said plug away from said outlet, whereby said sealing surface is lifted from sealing engagement with said chamber wall, for opening said outlet to permit fluid to pass from said chamber and exit said valve housing.

8. A dispensing valve, comprising: a valve housing, with said housing having a chamber accessible to a fluid container and a chamber wall containing an outlet through which fluid is to be dispensed from said chamber:

a spring; and actuator means; said spring and actuator means being disposed in said valve housing;

said actuator means being movably mounted and having an unoperated position in which said outlet is closed and an operated position in which said outlet is open;

said spring being of predetermined length and comprising a hollow body of elastic material having a trumpet horn shape, having a tubular end portion at one end and an outwardly flared portion at an opposed end with an axially extending passage therethrough;

said actuator means for applying a force on said spring in the direction of said spring axis upon movement of said actuator means to said operated position, wherein the length of said spring reduces and said flared end of said spring expands radially outwardly to temporarily store additional mechanical energy;

seal means integral with an end of said spring, said seal means being normally seated to a portion of said chamber and circumscribing said outlet in a sealing engagement to prevent fluid in said chamber from exiting through said outlet;

said actuator means including:

shaft means extending through said passage in said spring, said shaft means including an enlarged end portion at one end, said end portion radially outwardly extending and engaging the end of said spring at a position on said end located radially inwardly of said seal means with said end portion at least partially filling said outlet; said shaft means being mounted for movement in a direction along the axis of said shaft from a unoperated position to an operated position; and lever means coupled to said shaft means for pulling said shaft means in the axial direction to move said shaft means, wherein said enlarged end portion of said shaft compresses the length of said spring and raises said seal means to release said sealing engagement, whereby fluid may exit through said outlet;

and wherein said lever means further comprises: a lever; a cam; means connecting said lever integrally with said cam, wherein said cam is movable with said lever; said cam having a cam surface engaging an upper surface of said housing; living hinge means integrally connecting said lever to said shaft means; whereby pivoting of said lever and said cam creates a pulling force through said living hinge on said shaft means.

9. The invention as defined in claim 8 wherein said lever is manually pivotable in both clockwise and counterclockwise directions, said cam means being responsive to a predetermined degree of angular rotation of said handle in one of said directions for locking said lever at such degree of rotation, whereby said outlet is maintained open.

10. The invention as defined in claim 8, wherein said actuator means comprises a plastic material and wherein said spring comprises a plastic rubber material.

11. A valve for dispensing pressurized fluid from a container, comprising:
(1) a valve housing for mounting to a pressurized fluid container, said valve housing including:
  (1)(a) a first chamber accessible to any fluid in said container,
  (1)(b) a second chamber, said second chamber overlying said first chamber,
  (1)(c) a spout connected to said second chamber defining a passage to permit any fluid to exit said second chamber external of the valve,
  (1)(d) an interchamber passage between said first and second chamber, and
  (1)(e) an upwardly extending tubular wall defining a cavity overlying said second chamber;
(2) a shaft, said shaft including:
  (2)(a) an axially extending depression in an outer surface defining a slot, said slot being of predetermined length and being located between predetermined positions along the axis of said shaft,
  (2)(b) a first shaft cap at one end of said shaft portion, said first shaft cap containing a tapered rim portion extending radially outwardly from said shaft, and
  (2)(c) a second shaft cap at the remaining end of said shaft, said second cap containing a rim portion radially outwardly extending from said shaft;
(3) compression spring means, said compression spring means comprising:
a body of elastic material having a central passage therethrough and defining a trumpet horn shape geometry comprising a tubular portion and a flared horn like portion with an outer edge of said horn like portion defining a first fluid sealing surface and an edge of said tubular portion defining a second sealing surface;
(4) a push button, said pushbutton containing
  (4)(a) a push surface,
  (4)(b) a first downwardly projecting skirt portion on an underside of said push surface, with said first skirt portion containing a radially inwardly directed rim portion, said skirt portion for receiving said first shaft cap therewith and said rim portion thereof capturing the underside of said rim of first shaft cap to prevent withdrawal of said first cap from said push button, said first skirt portion having sufficient flexibility to permit insertion of said first shaft cap therewithin, and,
  (4)(c) further containing a second downwardly projecting skirt portion circumscribing the periphery of said push surface;
said shaft extending through said passage in said compression spring means, said second chamber, said interchamber passage between said first and second chambers, and into said first chamber with said second shaft cap being located within said first chamber;
said compression spring means being located within said tubular cavity defined by said housing tubular wall underlying said push button and overlying said second chamber, with said second sealing edge at said flared end of said compression spring means being in abutting relationship with an outer wall of said second chamber and with said first sealing edge of said compression spring being in pressing engagement with said first skirt portion of said push button for providing a force on said shaft means in a direction along the axis of said shaft to bias said shaft in a first longitudinal position;

said upwardly extending tubular wall of said housing encircling said spring means, and encompassing an area of slightly larger size than said push button, whereby said outer skirt of said pushbutton is at least partially received within said tubular wall; and said top wall of said second chamber being of greater radius than said flared end of said spring means to define a clearance space between said flared end of said spring and said tubular wall of said housing; and (5) an O-ring seal; said O-ring seal being located within said first chamber and mounted to said shaft with said O-ring seal being seated upon said second shaft cap, said O-ring seal being greater in size than said interchamber passage for normally providing a fluid seal between said shaft and said first chamber to prevent leakage of fluid between said chambers through said interchamber passage, responsive to said shaft being held in said first longitudinal position by said compression spring means;

whereby depression of said push button further compresses said compression spring to cause said flared portion of said compression spring to elastically spread outwardly along the upper surface of the wall of said second chamber, with the lateral extent of spreading being limited by said outer tubular wall of said housing, increasing the mechanical energy temporarily stored within said compression spring, and moves said shaft in the shaft's axial direction to position said O-ring seal out of sealing engagement with said wall of said first chamber, opening said interchamber passage, and positioning portions of said elongated shaft slot in both said first and second chambers to enlarge said interchamber passage, permitting fluid to pass through said slot between said chambers; and whereby release of said push button permits said compression spring to restore said pushbutton and return said shaft to the normal position with said O-ring seal sealing said interchamber passage.

* * * * *